United States Patent
Xu

(10) Patent No.: US 12,027,781 B2
(45) Date of Patent: Jul. 2, 2024

(54) ULTRA WIDE BAND BASE STATION AND POSITIONING METHOD THEREFOR

(71) Applicant: Shenzhen Sunway Communication Co., Ltd., Shenzhen (CN)

(72) Inventor: Qing Xu, Shenzhen (CN)

(73) Assignee: SHENZHEN SUNWAY COMMUNICATION CO., LTD., Shenzhen (CN)

(*) Notice: Subject to any disclaimer, the term of this patent is extended or adjusted under 35 U.S.C. 154(b) by 235 days.

(21) Appl. No.: 17/585,262

(22) Filed: Jan. 26, 2022

(65) Prior Publication Data

US 2022/0393348 A1 Dec. 8, 2022

Related U.S. Application Data

(63) Continuation of application No. PCT/CN2021/113957, filed on Aug. 23, 2021.

(30) Foreign Application Priority Data

Apr. 15, 2021 (CN) .......................... 202110403936.9

(51) Int. Cl.
*H01Q 1/24* (2006.01)
*H01Q 3/24* (2006.01)
*H01Q 5/25* (2015.01)

(52) U.S. Cl.
CPC ............... *H01Q 5/25* (2015.01); *H01Q 1/246* (2013.01); *H01Q 3/24* (2013.01)

(58) Field of Classification Search
CPC ............. H01Q 5/25; H01Q 1/246; H01Q 3/24

USPC ......................................................... 343/702
See application file for complete search history.

(56) References Cited

U.S. PATENT DOCUMENTS

| | | | | |
|---|---|---|---|---|
| 2009/0264086 | A1* | 10/2009 | Song | H04B 1/006 455/90.2 |
| 2011/0105026 | A1* | 5/2011 | Hsiao | H04B 1/006 455/41.2 |
| 2019/0199399 | A1* | 6/2019 | Vo | H04B 1/71637 |

FOREIGN PATENT DOCUMENTS

EP 4253988 * 10/2023 ............... G01S 3/28

* cited by examiner

*Primary Examiner* — Peguy Jean Pierre
(74) *Attorney, Agent, or Firm* — Stein IP, LLC

(57) ABSTRACT

The present invention discloses a UWB base station and a positioning method therefor. The UWB base station includes four antennae, obverse sides of the four antennae respectively face four azimuth directions, by which 360° may be uniformly divided, on a horizontal section. Azimuth directions faced by the first and the third antenna differ by 180°, and azimuth directions faced by the second and the fourth antenna differ by 180°. The station further includes a single-pole and a double-pole double-throw switch and a UWB module, the UWB module includes a transmitting end, a first and a second receiving end; first receiving end is respectively connected to the second and fourth antenna through single-pole double-throw switch; and transmitting end and second receiving end are respectively connected to the first and third antenna through double-pole double-throw switch. According to the invention, 360° omnidirectional positioning can be achieved, and the positioning precision is high.

20 Claims, 5 Drawing Sheets

ULTRA WIDE BAND BASE STATION AND POSITIONING METHOD THEREFOR

CROSS-REFERENCE TO RELATED APPLICATIONS

This application is a continuation of International Application No. PCT/CN2021/113957, filed Aug. 23, 2021, which claims the benefit of Chinese Application No. 202110403936.9, filed Apr. 15, 2021, in the China National Intellectual Property Administration. All disclosures of the documents named above are incorporated herein by reference.

TECHNICAL FIELD

The present invention relates to the technical field of positioning, in particular to an ultra wide band base station and a positioning method therefor.

BACKGROUND ART

Recently, a UWB (Ultra Wide Band) technology has attracted more and more attention in the industry. A UWB has the advantages such as low power consumption, good anti-multipath effect, low system complexity and high positioning precision so as to be widely applied in various aspects such as short-distance precise positioning (including distance and angle positioning), spatial awareness and short-distance point-to-point data transmission.

When the UWB is used for positioning, an AOA (Angle of Arrival) positioning method is generally used. A receiving end (UWB base station) is configured with double directional antennae or an antenna array, an angle of a transmitting end (measured tag) relative to the receiving end (UWB base station) is calculated by measuring a difference of time or phases that a pulse signal transmitted by a positioning antenna of the transmitting end (measured tag) reaches different antennae of the receiving end (UWB base station), and then, coordinates in a plane are defined. For example, as shown in FIG. 1, a receiving end (base station module) is provided with two UWB antennae, signal differences of the two UWB antennae and a measured object (tag module in FIG. 1) are compared, and then, a relative distance and angle are calculated.

A UWB base station in a current UWB positioning system generally adopts double directional antennae, angles and distances of measured antennae (tags) within the 180 DEG range of an obverse side of a base station may be measured, but positions of objects within the 180 DEG range of a region on the reverse side of the base station may not be measured, and therefore, a plurality of base stations are required to cover the measurement range of the overall horizontal plane. For example, during indoor positioning, a plurality of UWB base stations are fixed and mounted on different positions of a wall, and thus, the specific positions of the measured antennae (tags) of the UWB may be determined.

However, for this manner, a plurality of receiving chips and a plurality of groups of receiving antennae need to be used, and data control among a plurality of base stations is also relatively complicated.

SUMMARY OF THE INVENTION

The technical problem to be solved by the present invention is to provide a UWB base station and a positioning method therefor, by which 360° omnidirectional positioning can be achieved, and the positioning precision is high.

In order to solve the above-mentioned technical problems, the present invention adopts the technical solutions: provided is a UWB base station including four antennae which are respectively a first antenna, a second antenna, a third antenna and a fourth antenna, wherein obverse sides of the four antennae respectively face four azimuth directions on a horizontal section, and two adjacent azimuth directions in the four azimuth directions differ by 90°; the azimuth directions faced by the first antenna and the third antenna differ by 180°, and the azimuth directions faced by the second antenna and the fourth antenna differ by 180°; and further including a single-pole double-throw switch, a double-pole double-throw switch and a UWB module, wherein the UWB module includes a transmitting end, a first receiving end and a second receiving end; the first receiving end is connected to an input end of the single-pole double-throw switch, and two output ends of the single-pole double-throw switch are respectively connected to the second antenna and the fourth antenna in a one-to-one correspondence manner; and the transmitting end and the second receiving end are respectively connected to two input ends of the double-pole double-throw switch in a one-to-one correspondence manner, and two output ends of the double-pole double-throw switch are respectively connected to the first antenna and the third antenna in a one-to-one correspondence manner.

The present invention further provides a positioning method for the above-mentioned UWB base station, including:

dividing the horizontal section into four regions according to the four azimuth directions, wherein each region respectively corresponds to two antennae according to the two azimuth directions adjacent to the region;

by switching the single-pole double-throw switch and the double-pole double-throw switch, respectively connecting the four antennae to the first receiving end or the second receiving end of the UWB module, and respectively acquiring signal intensities, received by the four antennae, of a measured antenna;

determining a region where the measured antenna is located according to the signal intensities;

by switching the single-pole double-throw switch and the double-pole double-throw switch, respectively connecting the first receiving end and the second receiving end of the UWB module to the two antennae corresponding to the region where the measured antenna is located;

acquiring a phase difference of signals, received by the two antennae corresponding to the region where the measured antenna is located, of the measured antenna; and performing analysis according to the phase difference, a distance between the two antennae corresponding to the region where the measured antenna is located and wavelengths of the signals of the measured antenna to obtain an azimuth of the measured antenna.

The present invention has the beneficial effects that by placing the antennae to be stereoscopic and to respectively face different azimuth directions, the isolation among the antennae is greatly improved, so that a final positioning result is more accurate. The antennae pass through the switches and the UWB module, so that the switching of the antennae among the two receiving end and the one transmitting end of the UWB module is achieved. The 360° of the horizontal section may be divided into the four regions by the four azimuth directions faced by the four antennae, and the region where the measured antenna is located may be determined by scanning the signal intensities received by the four antennae. The two antennae of which the azimuth directions differ by 180° are connected to the same receiving end, so that the two receiving ends of the UWB module may be connected to the two antennae corresponding to any one region at the same time, and then, the specific azimuth of the measured antenna in the region can be determined based on the AOA. According to the present invention, 360° omni-directional positioning can be achieved by only using one single-transmitting and double-receiving UWB module in cooperation with the stereoscopic layout of the antennae and the application of the switches, and there are no errors brought by applying a plurality of groups of chips so that the positioning precision is high.

DETAILED DESCRIPTION OF THE INVENTION

In order to describe the technical contents as well as achieved purposes and effects of the present invention in detail, detailed descriptions will be shown as follows in conjunction with implementation manners and cooperation with the accompanying drawings.

Figure 1:
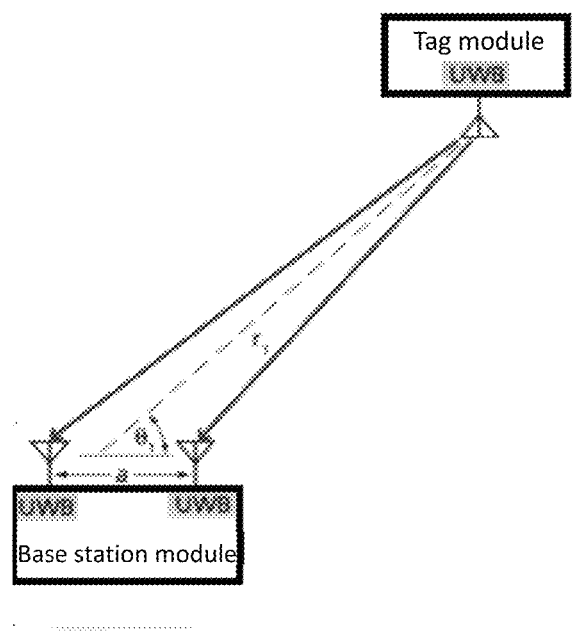
FIG. 1 is a schematic diagram showing an existing UWB AOA positioning principle.
Figure 2:
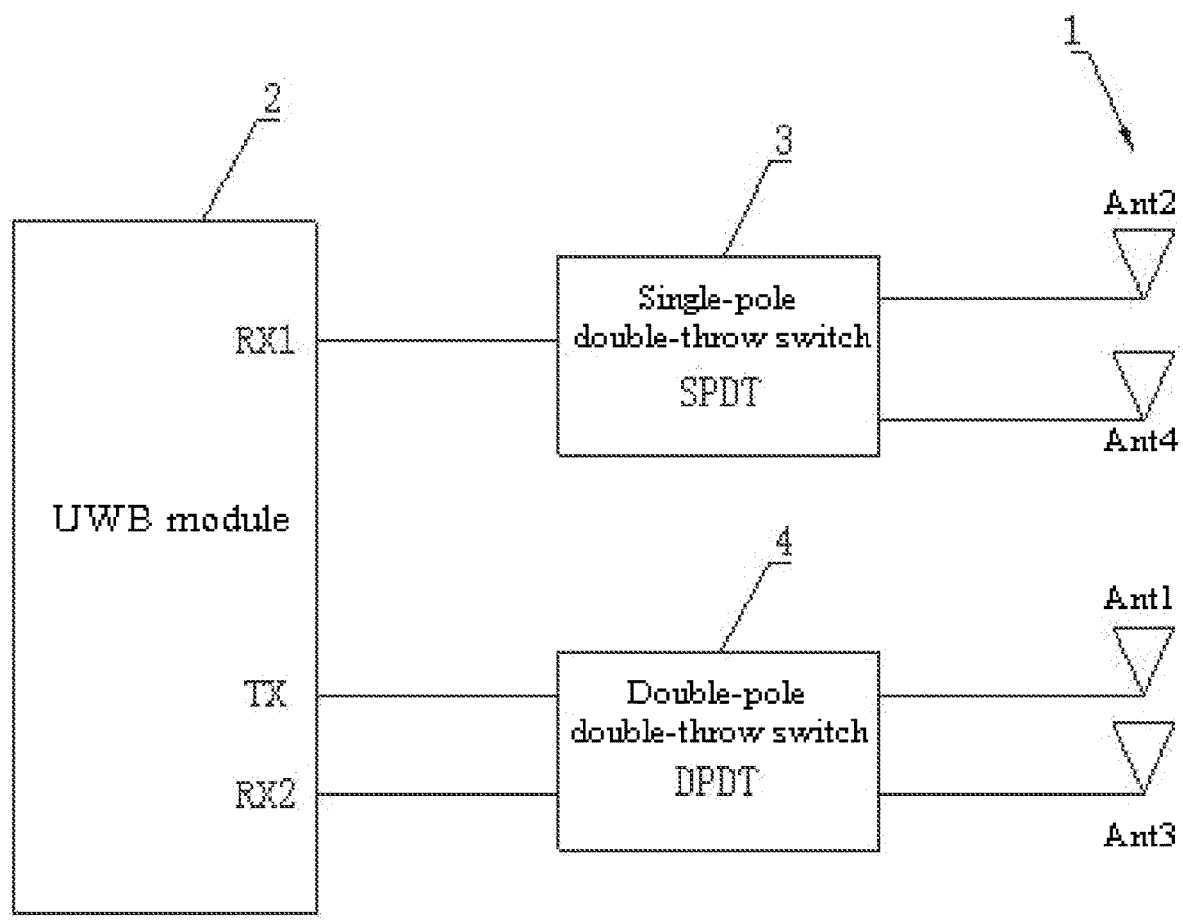
FIG. 2 is a schematic diagram showing a structure of a UWB base station in a first embodiment of the present invention.

Reference is made to FIG. 2, provided is a UWB base station including four antennae which are respectively a first antenna, a second antenna, a third antenna and a fourth antenna, obverse sides of the four antennae respectively face four azimuth directions on a horizontal section, and two adjacent azimuth directions in the four azimuth directions differ by 90°; the azimuth directions faced by the first antenna and the third antenna differ by 180°, and the azimuth directions faced by the second antenna and the fourth antenna differ by 180°; and further including a single-pole double-throw switch, a double-pole double-throw switch and a UWB module, the UWB module includes a transmitting end, a first receiving end and a second receiving end; the first receiving end is connected to an input end of the single-pole double-throw switch, and two output ends of the single-pole double-throw switch are respectively connected to the second antenna and the fourth antenna in a one-to-one correspondence manner; and the transmitting end and the second receiving end are respectively connected to two input ends of the double-pole double-throw switch in a one-to-one correspondence manner, and two output ends of the double-pole double-throw switch are respectively connected to the first antenna and the third antenna in a one-to-one correspondence manner.

Known from the above-mentioned description, the present invention has the beneficial effects that 360° omnidirectional positioning is achieved by only using one single-transmitting and double-receiving UWB module in cooperation with the stereoscopic layout of the antennae and the application of the switches, and there are no errors brought by applying a plurality of groups of chips so that the positioning precision is high.

Further, the UWB base station further includes a supporting body, the supporting body is shaped like a cuboid, and the four antennae are respectively arranged on four outer sides of the supporting body in a one-to-one correspondence manner.

Known from the above-mentioned description, it is ensured that the four antennae respectively face the four azimuth directions by which 360° may be uniformly divided.

Further, the supporting body is shaped like a hollow bottomless cuboid.

Further, the supporting body is integrally formed with the four antennae.

Known from the above-mentioned description, the manufacturing cost can be reduced.

Further, geometric centers of the first antenna, the second antenna, the third antenna and the fourth antenna are located on the same plane.

Known from the above-mentioned description, positioning errors brought by height differences among the antennae are avoided.

The present invention further provides a positioning method for the above-mentioned UWB base station, including:

the horizontal section is divided into four regions according to the four azimuth directions, each region respectively corresponds to two antennae according to the two azimuth directions adjacent to the region;

by switching the single-pole double-throw switch and the double-pole double-throw switch, the four antennae are respectively connected to the first receiving end or the second receiving end of the UWB module, and signal intensities, received by the four antennae, of a measured antenna are respectively acquired;

a region where the measured antenna is located is determined according to the signal intensities;

by switching the single-pole double-throw switch and the double-pole double-throw switch, the first receiving end and the second receiving end of the UWB module are respectively connected to the two antennae corresponding to the region where the measured antenna is located;

a phase difference of signals, received by the two antennae corresponding to the region where the measured antenna is located, of the measured antenna is acquired; and analysis is performed according to the phase difference, a distance between the two antennae corresponding to the region where the measured antenna is located and wavelengths of the signals of the measured antenna to obtain an azimuth of the measured antenna.

Further, the step that the region where the measured antenna is located is determined according to the signal intensities specifically includes:

the signal intensities, received by the four antennae, of the measured antenna are compared, and the two antennae corresponding to two higher signal intensities are determined; and the region where the measured antenna is located is determined according to the region corresponding to the two corresponding antennae.

Known from the above-mentioned description, the four antennae are all directional antennae, and therefore, when the measured antenna is located in a certain region, the signal intensities, received by the two antennae corresponding to the region, of the measured antenna are certainly higher than the signal intensities received by the other two antennae.

Further, the step that analysis is performed according to the phase difference, the distance between the two antennae corresponding to the region where the measured antenna is located and the wavelengths of the signals of the measured antenna to obtain the azimuth of the measured antenna specifically includes:

calculation is performed according to a formula $\theta = \arcsin(\alpha\lambda/2\pi d)$ to obtain an AOA of the signals of the measured antenna, $\theta$ represents the AOA of the signals of the measured antenna, $\lambda$ represents the wavelengths of the signals of the measured antenna, and d represents the distance between the two antennae corresponding to the region where the measured antenna is located.

First Embodiment

Reference is made to FIG. 2 to FIG. 6, the first embodiment of the present invention provides a UWB base station which may be applied to a product such as a wireless sound box and a wireless router to add a positioning function of the product.

As shown in FIG. 2, the UWB base station includes four antennae respectively being a first antenna Ant1, a second antenna Ant2, a third antenna Ant3 and a fourth antenna Ant4 and further includes a UWB module 2, a single-pole double-throw switch (SPDT) 3 and a double-pole double-throw switch (DPDT) 4, the UWB module 2 is provided with a transmitting end Tx, a first receiving end Rx1 and a second receiving end Rx2. In the present embodiment, the UWB module may be a UWB chip which may specifically adopt an Sr150-type UWB chip.

The first receiving end Rx1 is connected to an input end of the single-pole double-throw switch 3, and two output ends of the single-pole double-throw switch 3 are respectively connected to the second antenna Ant2 and the fourth antenna Ant4 in a one-to-one correspondence manner; and the transmitting end Tx and the second receiving end Rx2 are respectively connected to two input ends of the double-pole double-throw switch 4 in a one-to-one correspondence manner, and two output ends of the double-pole double-throw switch 4 are respectively connected to the first antenna Ant1 and the third antenna Ant3 in a one-to-one correspondence manner.

In other embodiments, it is also possible that the second antenna Ant2 and the fourth antenna Ant4 are connected to the transmitting end Tx and the second receiving end Rx2 by virtue of the double-pole double-throw switch, and the first antenna Ant1 and the third antenna Ant3 are connected to the first receiving end Rx1 by virtue of the single-pole double-throw switch.

Figure 3:
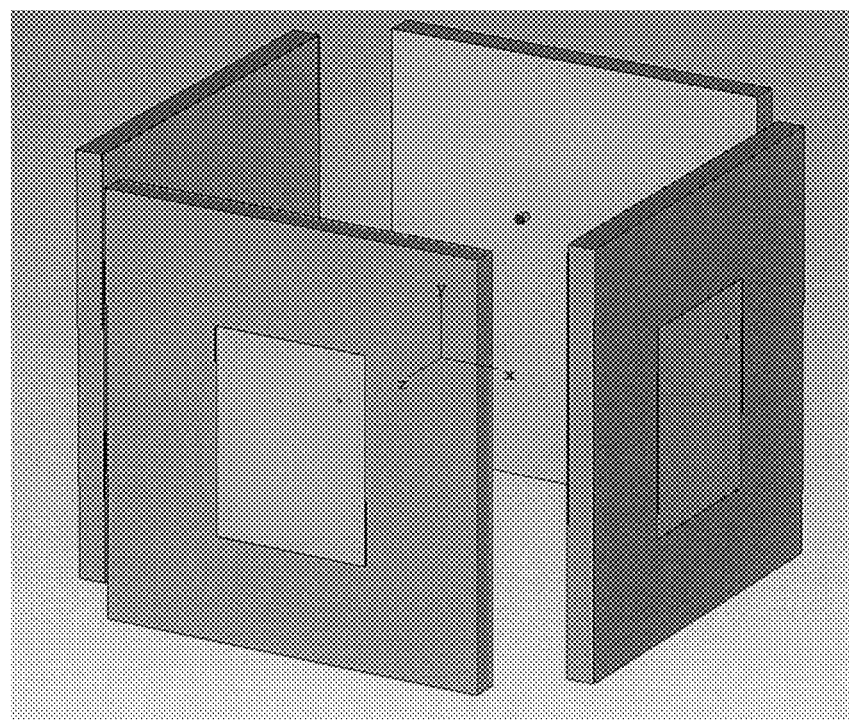
FIG. 3 is a schematic diagram showing positions of four antennae in the first embodiment of the present invention.
Figure 4:
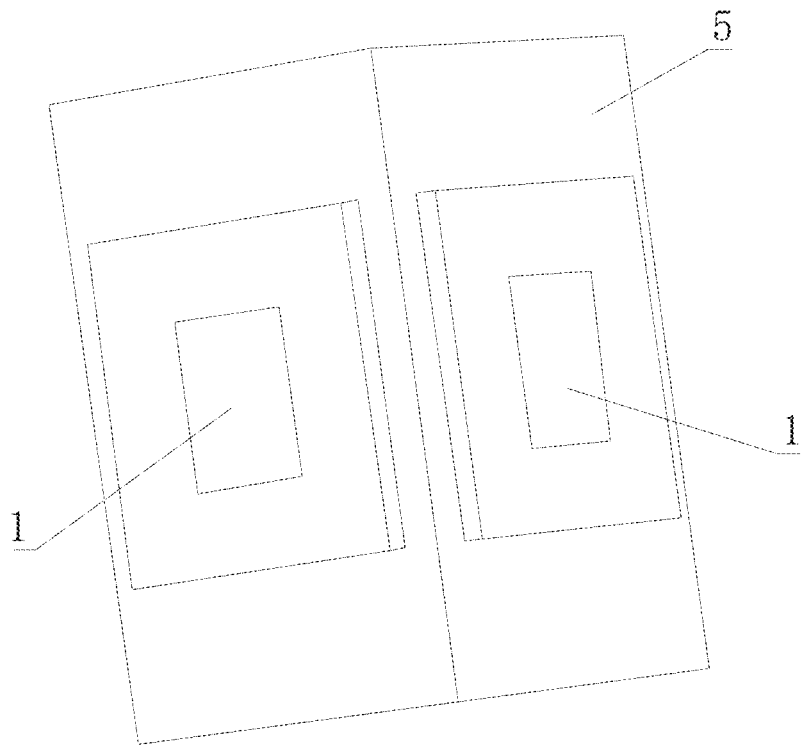
FIG. 4 is a schematic diagram showing a structure of a supporting body in the first embodiment of the present invention.

As shown in FIG. 3, the four antennae are all vertically arranged, obverse sides of the four antennae respectively face four azimuth directions on a horizontal section, and two adjacent azimuth directions in the four azimuth directions differ by 90°. Further, as shown in FIG. 4, the UWB base station further includes a supporting body 5, the supporting body 5 is shaped like a cuboid, and the four antennae 1 are respectively arranged on four outer sides of the supporting body 5 in a one-to-one correspondence manner, so that the four antennae may respectively face the four azimuth directions by which 360° may be uniformly divided. Preferably, the supporting body is shaped like a hollow bottomless cuboid, that is, it is defined by four side plates. The supporting body may be integrally formed with the four antennae. Preferably, geometric centers of the four antennae are located on the same plane.

Figure 5:
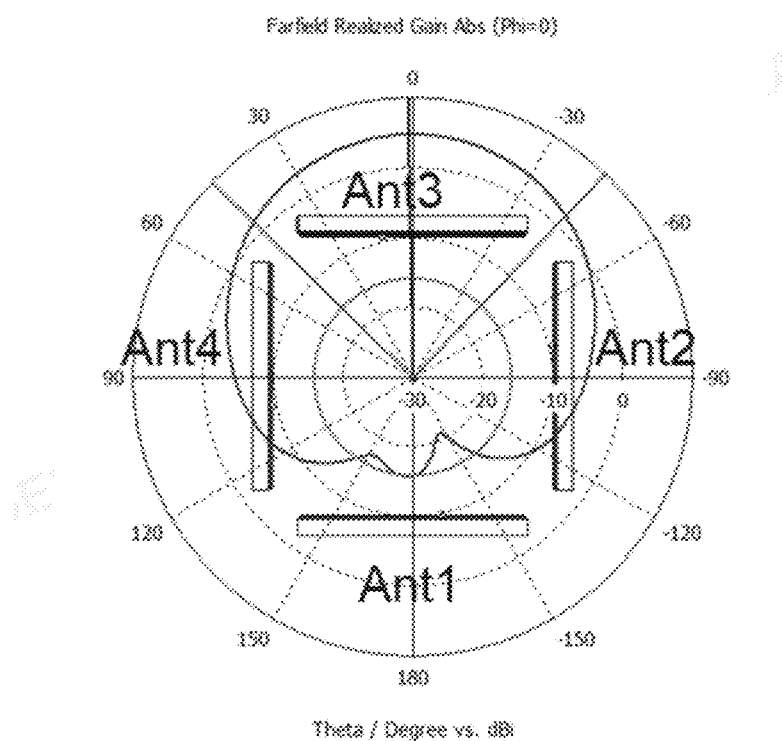
FIG. 5 is a schematic diagram showing the four antennae on a horizontal section in the first embodiment of the present invention.

Further, the azimuth directions faced by the first antenna and the third antenna differ by 180°, and the azimuth directions faced by the second antenna and the fourth antenna differ by 180°. In the present embodiment, as shown in FIG. 5, the obverse side of the first antenna Ant1 faces a 180° azimuth direction, the obverse side of the second antenna Ant2 faces a 270° azimuth direction, the obverse side of the third antenna Ant3 faces a 0° azimuth direction, and the obverse side of the fourth antenna Ant4 faces a 90° azimuth direction. It can be seen that the two adjacent antennae are perpendicular to each other in spatial position.

The azimuth directions faced by two antennae differ by 180°, which is equivalent to that the spatial positions of the two antennae are opposite. The two opposite antennae are connected to the same receiving end of the UWB module by virtue of a switch, so that the two antennae connected to the two receiving ends of the UWB module are adjacent in spatial position no matter how to switch the single-pole double-throw switch and the double-pole double-throw switch.

Figure 6:
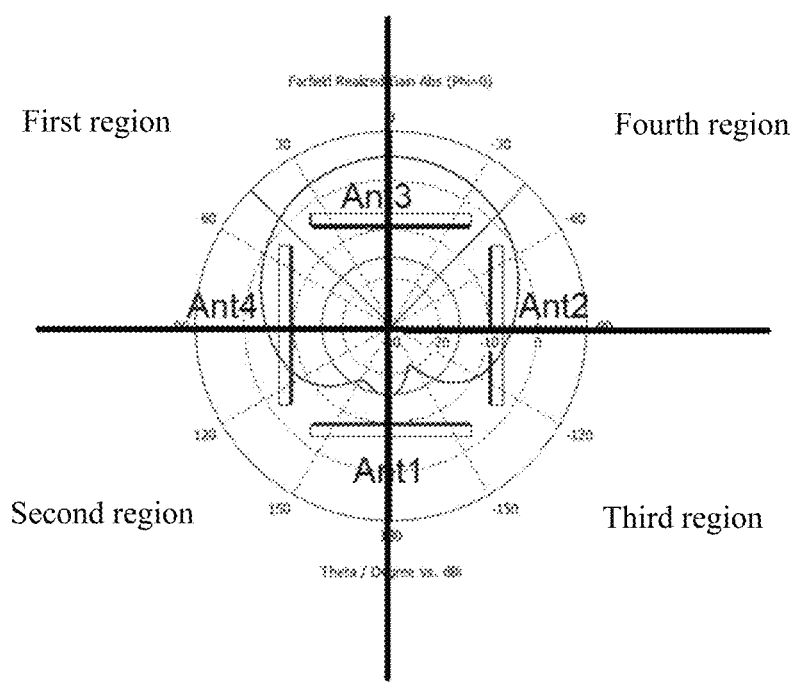
FIG. 6 is a schematic diagram showing four regions in the first embodiment of the present invention.

In actual test, the horizontal section (phi=0) may be divided into four regions according to the azimuth directions faced by the four antennae, and each region is within the range of 90°. As shown in FIG. 6, the first region corresponds to 0° to 90°, the second region corresponds to 90° to 180°, the third region corresponds to 180° to 270°, and the fourth region corresponds to 270° to 360° (360° is also 0°). Each region respectively corresponds to two antennae according to the two azimuth directions adjacent to the region. In the present embodiment, the first region corresponds to the third antenna Ant3 and the fourth antenna Ant4, the second region corresponds to the fourth antenna Ant4 and the first antenna Ant1, the third region corresponds to the first antenna Ant1 and the second antenna Ant2, and the fourth region corresponds to the second antenna Ant2 and the third antenna Ant3.

The four antennae are all directional antennae, and therefore, when the measured antenna is located in a certain region, the signal intensities, received by the two antennae corresponding to the region, of the measured antenna are certainly higher than the signal intensities received by the other two antennae. For example, when the measured antenna is located in the first region, the signal intensities of the third antenna and the fourth antenna are higher; when the measured antenna is located in the second region, the signal intensities of the fourth antenna and the first antenna are higher; when the measured antenna is located in the third region, the signal intensities of the first antenna and the second antenna are higher; and when the measured antenna is located in the fourth region, the signal intensities of the second antenna and the third antenna are higher. Therefore, the region where the measured antenna is located may be determined by scanning the signal intensities received by the four antennae.

Then, by switching the single-pole double-throw switch and the double-pole double-throw switch, the two receiving ends of the UWB module are connected to the two antennae with higher signal intensities, that is, the two antennae corresponding to the region where the measured antenna is located, and then, the specific azimuth of the measured antenna in the region where the measured antenna is located is determined by calculating an AOA.

Further, the UWB base station in the present embodiment may further include a master control module and a switch control module, the master control module is respectively connected to the UWB module and the switch control module; the master control module may control the signal transmission of the UWB module and may also analyze signals received by the UWB module, and the switch control module may control the switching of the single-pole double-throw switch and the double-pole double-throw switch, so that an automatic positioning function is achieved.

In the present embodiment, the technical problem of 360° omnidirectional scanning and positioning on a horizontal plane is solved by only using one single-transmitting and double-receiving UWB module in cooperation with the stereoscopic layout of the antennae and the application of the switches, and there are no errors brought by applying a plurality of groups of chips so that the positioning precision is high. Meanwhile, due to the adoption of the stereoscopic layout manner of the antennae, the isolation among the antennae is greatly improved, so that a final positioning result is more accurate.

Second Embodiment

Figure 7:
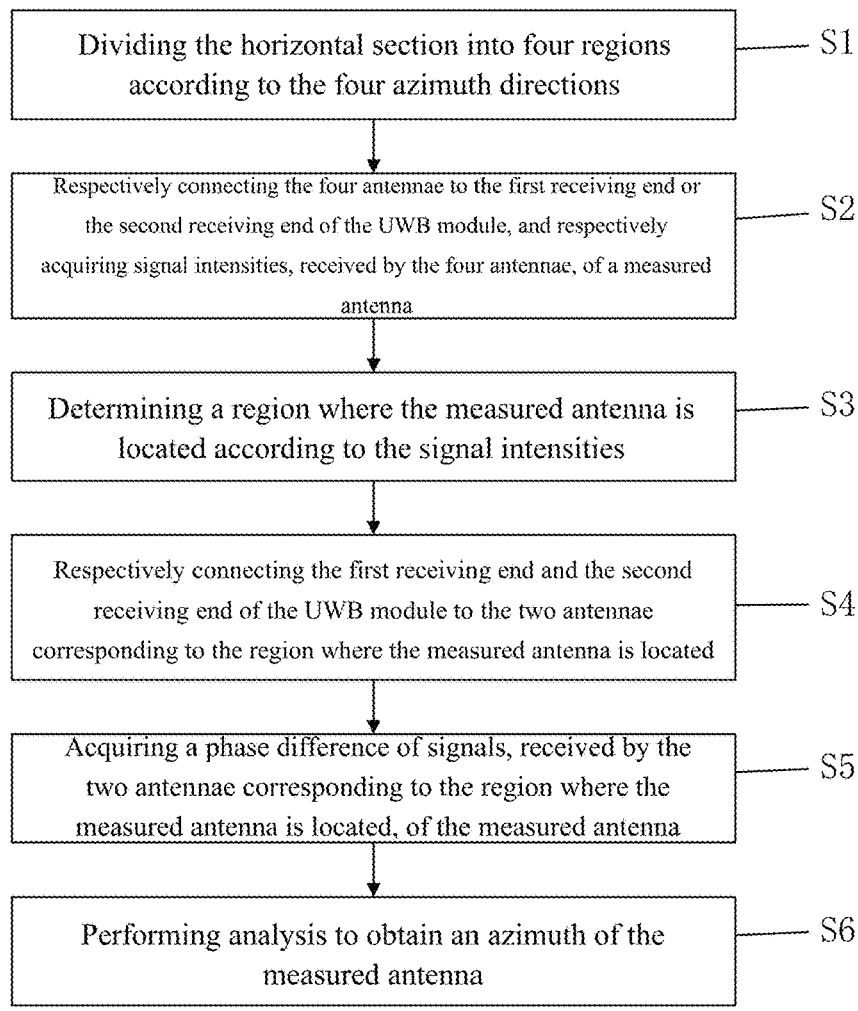
FIG. 7 is a process diagram showing a positioning method in a second embodiment of the present invention.
Figure 8:
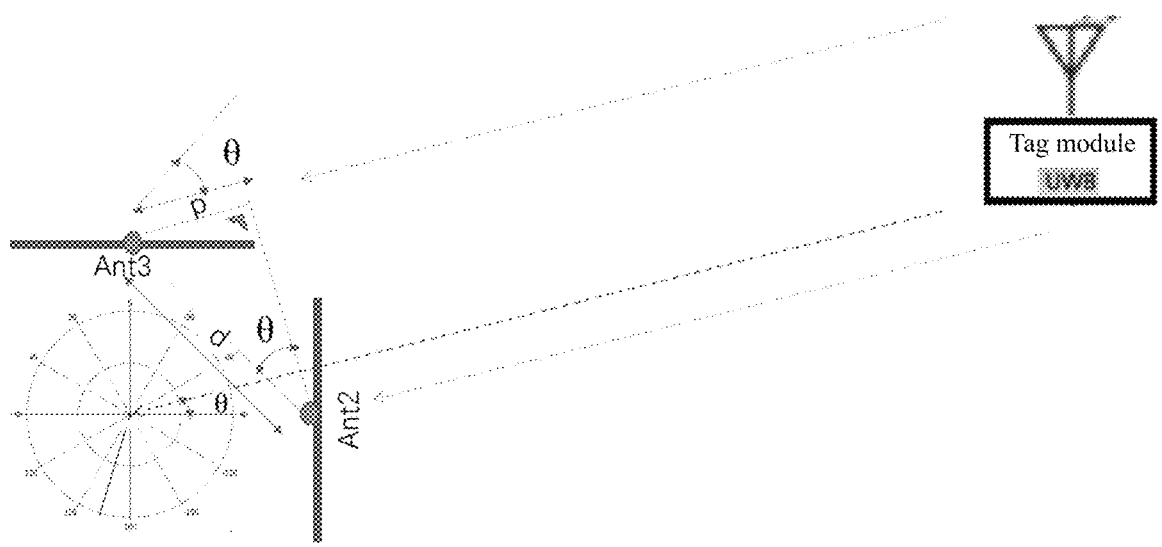
FIG. 8 is a schematic diagram showing a positioning principle in the second embodiment of the present invention.

Reference is made to FIG. 7 to FIG. 8, the present embodiment provides a positioning method for the UWB base station provided in the first embodiment. As shown in FIG. 7, the positioning method includes the following steps.

S1: the horizontal section is divided into four regions according to the four azimuth directions, each region respectively corresponds to two antennae according to the two azimuth directions adjacent to the region.

As shown in FIG. 5, in the present embodiment, the first region corresponds to the third antenna Ant3 and the fourth antenna Ant4, the second region corresponds to the fourth antenna Ant4 and the first antenna Ant1, the third region corresponds to the first antenna Ant1 and the second antenna Ant2, and the fourth region corresponds to the second antenna Ant2 and the third antenna Ant3.

S2: by switching the single-pole double-throw switch and the double-pole double-throw switch, the four antennae are respectively connected to the first receiving end or the second receiving end of the UWB module, and signal intensities, received by the four antennae, of a measured antenna are respectively acquired. That is, by switching the single-pole double-throw switch and the double-pole double-throw switch, the four antennae are successively connected to the receiving ends of the UWB module, and thus, the signal intensities (receiving power), received by the four antennae, of the measured antenna are acquired.

S3: a region where the measured antenna is located is determined according to the signal intensities. Specifically, the signal intensities, received by the four antennae, of the measured antenna are compared, and the two antennae corresponding to two higher signal intensities are determined; and the region corresponding to the two corresponding antennae is determined as the region where the measured antenna is located.

For example, if the signal intensities received by the second antenna Ant2 and the third antenna Ant3 are higher than the signal intensities received by the first antenna Ant1 and the fourth antenna Ant4, the region where the measured antenna is located is the fourth region.

S4: by switching the single-pole double-throw switch and the double-pole double-throw switch, the first receiving end and the second receiving end of the UWB module are respectively connected to the two antennae corresponding to the region where the measured antenna is located. That is, the two receiving ends of the UWB module are connected to the two antennae with higher signal intensities.

For example, if the region where the measured antenna is located is determined as the fourth region, the single-pole double-throw switch is switched, so that the first receiving end Rx1 of the UWB module is connected to the second antenna Ant2; and the double-pole double-throw switch is switched, so that the transmitting end Tx and the second receiving end Rx2 of the UWB module are connected to the third antenna Ant3.

S5: a phase difference of signals, received by the two antennae corresponding to the region where the measured antenna is located, of the measured antenna is acquired. For example, a phase difference of signals, reaching the second antenna Ant2 and the third antenna Ant3, of the measured antenna is acquired.

S6: analysis is performed according to the phase difference, a distance between the two antennae corresponding to the region where the measured antenna is located and wavelengths of the signals of the measured antenna to obtain an azimuth of the measured antenna.

As shown in FIG. 8, a distance from the measured antenna (tag module in FIG. 8) to the UWB base station is far greater than the size of the UWB base station, and therefore, waves transmitted to two antennae (that is, the two antennae corresponding to the region where the measured antenna is located, herein, the two antennae are assumed to be the second antenna Ant2 and the third antenna Ant3) in the UWB base station by the measured antenna may be regarded to be parallel to each other. It can be seen from FIG. 8 that a difference P of a distance from the measured antenna to the second antenna Ant2 and a distance from the measured antenna to the third antenna Ant3, a distance d between the second antenna Ant2 and the third antenna Ant3 and an AOA θ are in a relationship: p=d×sin θ.

Meanwhile, the wavelengths of the signals are expressed as λ=2πc/f, c represents a light speed, and f represents a signal frequency. The phase difference α of the measured antenna reaching the second antenna Ant2 and the third antenna Ant3 may be expressed by the difference P of the distances: α=(f/c)P=(2π/λ)P.

In combination with the above-mentioned formula, the formula θ=arc sin(αλ/2πd) may be derived, the distance d between the second antenna Ant2 and the third antenna Ant3 may be acquired by measurement. The measured antenna also needs to conform to a frequency band in a UWB protocol, a Channel5 (6.5G) or Channel9 (8 GHz) is generally used on the current market, and therefore, the wavelength and frequency of the measured antenna may be known in advance.

Therefore, the AOA of the signals of the measured antenna may be calculated according to the formula θ=arc sin(αλ/2πd), and thus, the specific azimuth of the measured antenna in the region where the measured antenna is located can be obtained.

In the present embodiment, firstly, the region where the measured antenna is located is determined according to the signal intensities received by the four antennae, and then, the specific azimuth of the measured antenna is determined in the region, so that the positioning accuracy can be improved.

In summary, according to the UWB base station and the positioning method therefor provided by the present invention, by placing the antennae to be stereoscopic and to respectively face different azimuth directions, the isolation among the antennae is greatly improved, so that a final positioning result is more accurate. The antennae pass through the switches and the UWB module, so that the switching of the antennae among the two receiving end and the one transmitting end of the UWB module is achieved. The 360° of the horizontal section may be divided into the four regions by the four azimuth directions faced by the four antennae, and the region where the measured antenna is located may be determined by scanning the signal intensities received by the four antennae. The two antennae of which the azimuth directions differ by 180° are connected to the same receiving end, so that the two receiving ends of the UWB module may be connected to the two antennae corresponding to any one region at the same time, and then, the specific azimuth of the measured antenna in the region can be determined based on the AOA. According to the present invention, 360° omnidirectional positioning can be achieved by only using one single-transmitting and double-receiving UWB module in cooperation with the stereoscopic layout of the antennae and the application of the switches, and there are no errors brought by applying a plurality of groups of chips so that the positioning precision is high.

The above descriptions are not intended to limit the patent scope of the present invention, but merely used as embodiments thereof. All equivalent transformations made according to the contents of the description and the accompanying drawings in the present invention, no matter whether they are directly or indirectly used in related technical fields, should fall within the protection scope of the present invention.

The invention claimed is:

1. A UWB base station, comprising four antennae which are respectively a first antenna, a second antenna, a third antenna and a fourth antenna, wherein obverse sides of the four antennae respectively face four azimuth directions on a horizontal section, and two adjacent azimuth directions in the four azimuth directions differ by 90°; the azimuth directions faced by the first antenna and the third antenna differ by 180°, and the azimuth directions faced by the second antenna and the fourth antenna differ by 180°; and further comprising a single-pole double-throw switch, a double-pole double-throw switch and a UWB module, wherein the UWB module comprises a transmitting end, a first receiving end and a second receiving end; the first receiving end is connected to an input end of the single-pole double-throw switch, and two output ends of the single-pole double-throw switch are respectively connected to the second antenna and the fourth antenna in a one-to-one correspondence manner; and the transmitting end and the second receiving end are respectively connected to two input ends of the double-pole double-throw switch in a one-to-one correspondence manner, and two output ends of the double-pole double-throw switch are respectively connected to the first antenna and the third antenna in a one-to-one correspondence manner.

2. The UWB base station of claim 1, further comprising a supporting body, wherein the supporting body is shaped like a cuboid, and the four antennae are respectively arranged on four outer sides of the supporting body in a one-to-one correspondence manner.

3. The UWB base station of claim 2, wherein the supporting body is shaped like a hollow bottomless cuboid.

4. A positioning method for the UWB base station of claim 3, comprising:
dividing the horizontal section into four regions according to the four azimuth directions, wherein each region respectively corresponds to two antennae according to the two azimuth directions adjacent to the region;
by switching the single-pole double-throw switch and the double-pole double-throw switch, respectively connecting the four antennae to the first receiving end or the second receiving end of the UWB module, and respectively acquiring signal intensities, received by the four antennae, of a measured antenna;
determining a region where the measured antenna is located according to the signal intensities;
by switching the single-pole double-throw switch and the double-pole double-throw switch, respectively connecting the first receiving end and the second receiving end of the UWB module to the two antennae corresponding to the region where the measured antenna is located;
acquiring a phase difference of signals, received by the two antennae corresponding to the region where the measured antenna is located, of the measured antenna; and
performing analysis according to the phase difference, a distance between the two antennae corresponding to the region where the measured antenna is located and wavelengths of the signals of the measured antenna to obtain an azimuth of the measured antenna.

5. The positioning method of claim 4, wherein the step of determining the region where the measured antenna is located according to the signal intensities specifically comprises:
comparing the signal intensities, received by the four antennae, of the measured antenna, and determining the two antennae corresponding to two higher signal intensities; and
determining the region where the measured antenna is located according to the region corresponding to the two corresponding antennae.

6. The positioning method of claim 4, wherein the step of performing analysis according to the phase difference, the distance between the two antennae corresponding to the region where the measured antenna is located and the wavelengths of the signals of the measured antenna to obtain the azimuth of the measured antenna specifically comprises:
performing calculation according to a formula $\theta = \arcsin(\alpha\lambda/2\pi d)$ to obtain an AOA of the signals of the measured antenna, $\theta$ represents the AOA of the signals of the measured antenna, $\lambda$ represents the wavelengths of the signals of the measured antenna, and d represents the distance between the two antennae corresponding to the region where the measured antenna is located.

7. The UWB base station of claim 2, wherein the supporting body is integrally formed with the four antennae.

8. A positioning method for the UWB base station of claim 7, comprising:
dividing the horizontal section into four regions according to the four azimuth directions, wherein each region respectively corresponds to two antennae according to the two azimuth directions adjacent to the region;
by switching the single-pole double-throw switch and the double-pole double-throw switch, respectively connecting the four antennae to the first receiving end or the second receiving end of the UWB module, and respectively acquiring signal intensities, received by the four antennae, of a measured antenna;

determining a region where the measured antenna is located according to the signal intensities;

by switching the single-pole double-throw switch and the double-pole double-throw switch, respectively connecting the first receiving end and the second receiving end of the UWB module to the two antennae corresponding to the region where the measured antenna is located;

acquiring a phase difference of signals, received by the two antennae corresponding to the region where the measured antenna is located, of the measured antenna; and performing analysis according to the phase difference, a distance between the two antennae corresponding to the region where the measured antenna is located and wavelengths of the signals of the measured antenna to obtain an azimuth of the measured antenna.

9. The positioning method of claim 8, wherein the step of determining the region where the measured antenna is located according to the signal intensities specifically comprises:

comparing the signal intensities, received by the four antennae, of the measured antenna, and determining the two antennae corresponding to two higher signal intensities; and determining the region where the measured antenna is located according to the region corresponding to the two corresponding antennae.

10. The positioning method of claim 8, wherein the step of performing analysis according to the phase difference, the distance between the two antennae corresponding to the region where the measured antenna is located and the wavelengths of the signals of the measured antenna to obtain the azimuth of the measured antenna specifically comprises:

performing calculation according to a formula $\theta=\arc\sin(\alpha\lambda/2\pi d)$ to obtain an AOA of the signals of the measured antenna, $\theta$ represents the AOA of the signals of the measured antenna, $\lambda$ represents the wavelengths of the signals of the measured antenna, and d represents the distance between the two antennae corresponding to the region where the measured antenna is located.

11. The positioning method of claim 8, wherein the step of determining the region where the measured antenna is located according to the signal intensities specifically comprises:

comparing the signal intensities, received by the four antennae, of the measured antenna, and determining the two antennae corresponding to two higher signal intensities; and determining the region where the measured antenna is located according to the region corresponding to the two corresponding antennae.

12. The positioning method of claim 8, wherein the step of performing analysis according to the phase difference, the distance between the two antennae corresponding to the region where the measured antenna is located and the wavelengths of the signals of the measured antenna to obtain the azimuth of the measured antenna specifically comprises:

performing calculation according to a formula $\theta=\arc\sin(\alpha\lambda/2\pi d)$ to obtain an AOA of the signals of the measured antenna, $\theta$ represents the AOA of the signals of the measured antenna, $\lambda$ represents the wavelengths of the signals of the measured antenna, and d represents the distance between the two antennae corresponding to the region where the measured antenna is located.

13. A positioning method for the UWB base station of claim 2, comprising:

dividing the horizontal section into four regions according to the four azimuth directions, wherein each region respectively corresponds to two antennae according to the two azimuth directions adjacent to the region;

by switching the single-pole double-throw switch and the double-pole double-throw switch, respectively connecting the four antennae to the first receiving end or the second receiving end of the UWB module, and respectively acquiring signal intensities, received by the four antennae, of a measured antenna;

determining a region where the measured antenna is located according to the signal intensities;

by switching the single-pole double-throw switch and the double-pole double-throw switch, respectively connecting the first receiving end and the second receiving end of the UWB module to the two antennae corresponding to the region where the measured antenna is located;

acquiring a phase difference of signals, received by the two antennae corresponding to the region where the measured antenna is located, of the measured antenna; and performing analysis according to the phase difference, a distance between the two antennae corresponding to the region where the measured antenna is located and wavelengths of the signals of the measured antenna to obtain an azimuth of the measured antenna.

14. The positioning method of claim 13, wherein the step of determining the region where the measured antenna is located according to the signal intensities specifically comprises:

comparing the signal intensities, received by the four antennae, of the measured antenna, and determining the two antennae corresponding to two higher signal intensities; and determining the region where the measured antenna is located according to the region corresponding to the two corresponding antennae.

15. The positioning method of claim 13, wherein the step of performing analysis according to the phase difference, the distance between the two antennae corresponding to the region where the measured antenna is located and the wavelengths of the signals of the measured antenna to obtain the azimuth of the measured antenna specifically comprises:

performing calculation according to a formula $\theta=\arc\sin(\alpha\lambda/2\pi d)$ to obtain an AOA of the signals of the measured antenna, $\theta$ represents the AOA of the signals of the measured antenna, $\lambda$ represents the wavelengths of the signals of the measured antenna, and d represents the distance between the two antennae corresponding to the region where the measured antenna is located.

16. The UWB base station of claim 1, wherein geometric centers of the first antenna, the second antenna, the third antenna and the fourth antenna are located on the same plane.

17. A positioning method for the UWB base station of claim 16, comprising:

dividing the horizontal section into four regions according to the four azimuth directions, wherein each region respectively corresponds to two antennae according to the two azimuth directions adjacent to the region;

by switching the single-pole double-throw switch and the double-pole double-throw switch, respectively connecting the four antennae to the first receiving end or the second receiving end of the UWB module, and respectively acquiring signal intensities, received by the four antennae, of a measured antenna;

determining a region where the measured antenna is located according to the signal intensities;

by switching the single-pole double-throw switch and the double-pole double-throw switch, respectively connecting the first receiving end and the second receiving end of the UWB module to the two antennae corresponding to the region where the measured antenna is located;

acquiring a phase difference of signals, received by the two antennae corresponding to the region where the measured antenna is located, of the measured antenna; and performing analysis according to the phase difference, a distance between the two antennae corresponding to the region where the measured antenna is located and wavelengths of the signals of the measured antenna to obtain an azimuth of the measured antenna.

18. A positioning method for the UWB base station of claim 1, comprising:

dividing the horizontal section into four regions according to the four azimuth directions, wherein each region respectively corresponds to two antennae according to the two azimuth directions adjacent to the region;

by switching the single-pole double-throw switch and the double-pole double-throw switch, respectively connecting the four antennae to the first receiving end or the second receiving end of the UWB module, and respectively acquiring signal intensities, received by the four antennae, of a measured antenna;

determining a region where the measured antenna is located according to the signal intensities;

by switching the single-pole double-throw switch and the double-pole double-throw switch, respectively connecting the first receiving end and the second receiving end of the UWB module to the two antennae corresponding to the region where the measured antenna is located;

acquiring a phase difference of signals, received by the two antennae corresponding to the region where the measured antenna is located, of the measured antenna; and performing analysis according to the phase difference, a distance between the two antennae corresponding to the region where the measured antenna is located and wavelengths of the signals of the measured antenna to obtain an azimuth of the measured antenna.

19. The positioning method of claim 18, wherein the step of determining the region where the measured antenna is located according to the signal intensities specifically comprises:

comparing the signal intensities, received by the four antennae, of the measured antenna, and determining the two antennae corresponding to two higher signal intensities; and determining the region where the measured antenna is located according to the region corresponding to the two corresponding antennae.

20. The positioning method of claim 18, wherein the step of performing analysis according to the phase difference, the distance between the two antennae corresponding to the region where the measured antenna is located and the wavelengths of the signals of the measured antenna to obtain the azimuth of the measured antenna specifically comprises:

performing calculation according to a formula $\theta=\arc\sin(\alpha\lambda/2\pi d)$ to obtain an AOA of the signals of the measured antenna, $\theta$ represents the AOA of the signals of the measured antenna, $\lambda$ represents the wavelengths of the signals of the measured antenna, and d represents the distance between the two antennae corresponding to the region where the measured antenna is located.

* * * * *